US005907141A

United States Patent [19]

Deaville et al.

[11] Patent Number: 5,907,141

[45] Date of Patent: May 25, 1999

[54] USE OF SECURITY COUPONS IN CONNECTION WITH LOCKING MECHANISMS FOR VENDING AND GAMING MACHINES

[75] Inventors: David Deaville; Patrick J. McGarry, both of West Chester, Pa.; Robert D. Ross, Gibbsboro, N.J.

[73] Assignee: Mars Incorporated, McLean, Va.

[21] Appl. No.: 08/684,405

[22] Filed: Jul. 19, 1996

[51] Int. Cl.[6] .............................. G06K 7/10; G06K 7/00

[52] U.S. Cl. .......................... 235/375; 235/381; 194/207

[58] Field of Search .................................. 235/375, 381, 235/382.5; 194/206, 207, 210

[56] References Cited

U.S. PATENT DOCUMENTS

| | | | |
|---|---|---|---|
| 4,459,052 | 7/1984 | Lundblad | 235/379 |
| 4,573,043 | 2/1986 | Heuker of Hoek et al. | 340/571 |
| 4,591,704 | 5/1986 | Sherwood et al. | 235/382.5 |
| 4,658,125 | 4/1987 | Kachi et al. | 235/449 |
| 4,670,643 | 6/1987 | Hain et al. | 235/375 |
| 4,809,837 | 3/1989 | Hayashi | 194/207 |
| 4,926,996 | 5/1990 | Eglise et al. | 194/205 |
| 4,997,128 | 3/1991 | Suris | 232/16 |
| 5,251,738 | 10/1993 | Dabrowski | 194/206 |
| 5,286,954 | 2/1994 | Sato et al. | 235/379 |
| 5,290,033 | 3/1994 | Bittner et al. | 273/138 A |
| 5,368,129 | 11/1994 | Von Kohorn | 186/52 |
| 5,415,264 | 5/1995 | Menoud | 235/382 |
| 5,420,406 | 5/1995 | Izawa et al. | 235/379 |
| 5,451,757 | 9/1995 | Heath, Jr. | 235/381 |
| 5,573,098 | 11/1996 | Widmer | 194/212 |
| 5,624,017 | 4/1997 | Plesko | 194/207 |
| 5,662,202 | 9/1997 | Suris | 194/206 |
| 5,742,034 | 4/1998 | Meeker | 235/375 |

FOREIGN PATENT DOCUMENTS

| | | | |
|---|---|---|---|
| 0 233 652 | 8/1987 | European Pat. Off. | 235/382.5 |
| 233652 | 8/1987 | European Pat. Off. | 235/382.5 |
| 0 381 550 | 8/1990 | European Pat. Off. | 194/207 |

*Primary Examiner*—Anita Pellman Gross
*Assistant Examiner*—Mark Tremblay
*Attorney, Agent, or Firm*—Fish & Richardson P.C.

[57] ABSTRACT

A method and apparatus for using electronic security coupons in connection with locking mechanisms for preventing unauthorized access to or removal of internal components of vending and gaming machines. A security coupon is received in the bill validator section of the machine, the security coupon is recognized, and the locking mechanism is unlocked. The security coupon optionally can be stored in a currency cassette.

46 Claims, 11 Drawing Sheets

USE OF SECURITY COUPONS IN CONNECTION WITH LOCKING MECHANISMS FOR VENDING AND GAMING MACHINES

BACKGROUND OF THE INVENTION

The invention relates generally to the use of security coupons in connection with locking mechanisms for vending and gaming machines.

Service personnel who are permitted access to the interior of vending and gaming machines face temptations to tamper with internal components of the machine or to remove cash collected by a currency validator when they are not authorized to do so. In addition, it is well known that vandals often target the currency validator portion of such machines. As a consequence, some vending and gaming machines boxes are equipped with multiple locks which can add significantly to the cost of the machine. Furthermore, in situations where multiple machines units and multiple personnel are involved, difficulties may be encountered in keeping track of the identity of personnel who are permitted access to the interior of a particular machine. Of particular concern, for example, are the difficulties encountered in keeping track of personnel who are authorized to remove a cash box, as well as the identity of the unit from which the particular cash box was removed.

SUMMARY OF THE INVENTION

In general, in one aspect, the invention features a method of using a security coupon in connection with a vending machine having a bill validator section and a lock. A security coupon is received in the validator section of the unit, and the security coupon is recognized. The lock is unlocked in response to recognizing the security coupon.

In another aspect, the invention features using a security coupon in connection with a bill validator-stacker unit having a bill validator section and a currency cassette locked to the unit. A security coupon is received in the bill validator section of the unit. The security coupon is recognized and stored in the currency cassette. After storing the security coupon, the currency cassette is unlocked from the unit to permit removal of the currency cassette from the unit.

In a further aspect, the invention features a currency validator-stacker unit including a validator section for determining whether inserted banknotes and security coupons are genuine, a removable currency cassette connected to the validator section, and a transport path for transporting genuine banknotes from the validator section to the currency cassette. The validator-stacker unit also includes a locking mechanism for locking the currency cassette to the unit, wherein the currency cassette can be removed from the currency validator-stacker unit only when the locking mechanism is unlocked. In addition, the validator-stacker unit includes a control unit for unlocking the locking mechanism when a security coupon received in the validator section is recognized as genuine.

In yet a further aspect, the invention features a vending machine having a front panel, an entryway in the front panel for receiving banknotes and security coupons, and a validator section connected to the entryway for determining whether inserted banknotes and security coupons are genuine. The vending machine also includes a removable currency cassette connected to the validator section and a transport path for transporting genuine banknotes from the validator section to the currency cassette. In addition, the vending machine has one or more locks to prevent unauthorized access to the vending machine, and a control unit for unlocking the one or more locks when a security coupon received in the validator section is recognized as genuine.

Various implementations of the invention include one or more of the following features. A code imprinted on the security coupon, such as a magnetic code or bar code or a watermark, can be recognized. The magnetic code can be formed, for example, using magnetic ink. Authorization to accept the security coupon as valid may be requested and/or received from a central network controller or may be stored in the machine's memory. A signal may be received limiting the time during which the security coupon is considered valid.

Certain implementations also include one or more of the following features. A front panel of the vending machine, as well as the currency cassette, can be unlocked in response to recognizing the security coupon. Unlocking the currency cassette may include unlocking an electronically controlled locking mechanism. The locking mechanism can include a spring and gravity loaded rod, and the currency cassette can include an opening through which the rod can be extended to lock the currency cassette to the currency validator. The control unit for unlocking the locking mechanism can include a microprocessor and a solenoid. Unlocking the currency cassette can include controlling the energy provided to the solenoid, energizing the solenoid, and controlling the position of the rod or locking member.

Furthermore, a microswitch for sensing when the currency cassette is removed from the currency validator-stacker unit can be included. Also, the position of an indicator flag can be controlled to indicate whether the currency cassette is locked to the unit.

Various implementations of the invention provide one or more of the following advantages. Security coupons such as those described above can be produced relatively inexpensively. Furthermore, the security coupons can be produced on the premises where they are to be used. The use of security coupons which can be recognized and validated by the bill validator portion of the vending machine can provide added security because the identity of personnel receiving each issued security coupon can be tracked. Also, since the bill validator portion of the machine performs the recognition and validation of inserted security coupons, existing bill validators can be used in conjunction with security coupons to provide a high level of security. The machine need not be retrofit with special devices designed for the sole purpose of receiving and identifying security cards or the like. Also, since the same entry slot can be used for inserting both banknotes and security coupons, the outer appearance of the validator need not be changed.

The use of security coupons may lessen the need for using passwords that must be entered to gain access to and remove internal components, cash and inventory from the machine. Furthermore, through the use of a central network controller, additional security can be provided by limiting the time during which the security coupon is considered valid. Also, the validity of lost or stolen coupons can be revoked at any time, for example, by the central network controller.

In those implementations in which the security coupon is stacked in the locked cassette, a highly secure paper trail is created for audit purposes. Thus, for example, cassettes from multiple machines or units can be positively tracked. Also, the use of the security coupon as the key to an electronic lock for the cassette can lessen the need for expensive locks used in some currency validator-stacker units.

Other features and advantages of the invention will be apparent from the following description, accompanying drawings, and the claims.

DESCRIPTION OF THE PREFERRED EMBODIMENTS

Figure 1:
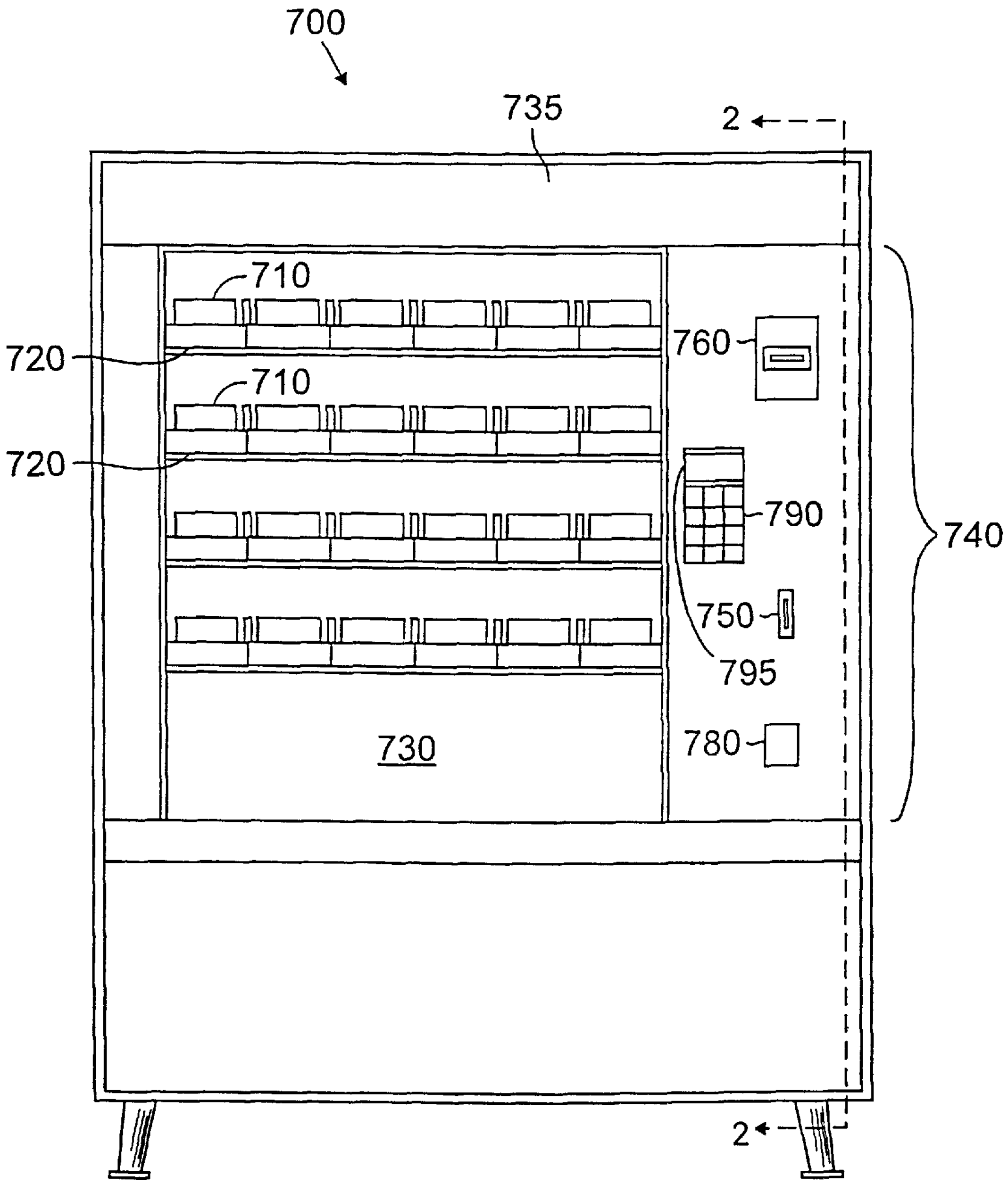
FIG. 1 is a front view of a vending machine.

FIG. 1 is a front view of an exemplary vending machine 700 in which the invention can be used. A variety of products 710 to be dispensed are stored in a display area inaccessible to customers, such as behind a transparent glass panel. Each product 710 is retained by a product delivery apparatus 720 that is selectively actuatable by a customer to dispense the product into a delivery area 730 from which the customer can retrieve the selected product.

The front panel 735 of the vending machine 700 has a control panel 740 having a coin slot 750 and a bill entryway 760. The control panel 740 also contains a coin return 780 and an item selector such as a keypad 790. A display 795 can provide instructions and information to a customer.

A customer initiates a transaction by depositing coins or bills of particular denominations into respective openings 750 or 760 along the control panel 740. Once sufficient payment has been deposited, the customer can select a product 710 to be dispensed using the keypad 790. The corresponding product delivery apparatus 720 will then dispense the selected product 710 to the product delivery area 730 where it can be retrieved by the customer. Any change resulting from the transaction can be paid back to the customer through the coin return opening 780.

Figure 2:
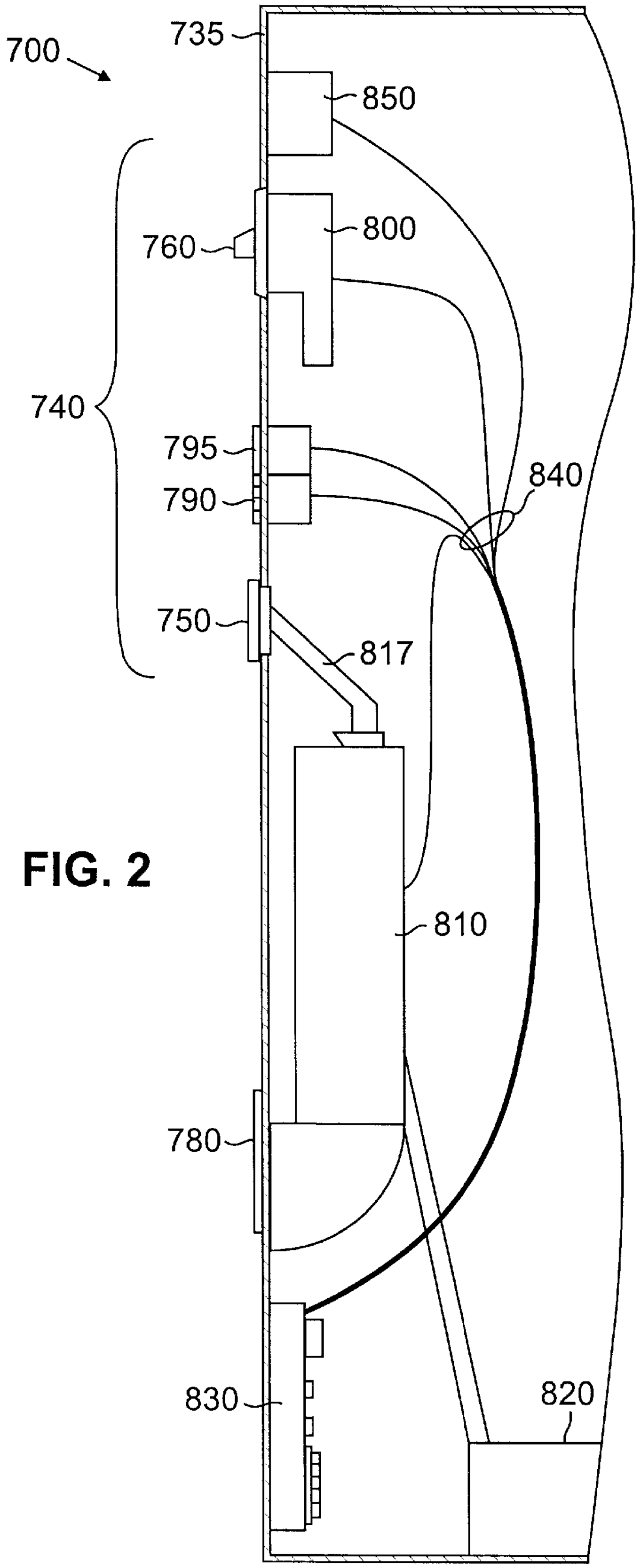
FIG. 2 is an enlarged cutaway side view of the vending machine of FIG. 1.

FIG. 2 is an enlarged, cutaway view along dotted line 2—2 of FIG. 1 which illustrates the layout of certain internal components of the vending machine. In particular, connected to the rear of the control panel 740 are a bill validator-stacker unit 800 aligned with the bill entryway 760 and a coin mechanism 810 connected to the coin slot 750 via a coin passageway 817. The coin mechanism is also connected to the coin return 780 and to a coin box 820. The keypad 790 and display 795 are also connected to the control panel 740, and are electronically connected via lines 840 to a vending controller 830. The bill validator-stacker unit 800 and the coin validator 810 are also electronically connected to the vending controller 830.

In general, the vending machine 700 includes one or more locks which prevent unauthorized access to and/or removal of internal components from the machine 700. For example, one or more electronically controlled locks 850 are located on the inside of the front panel 735. To service the vending machine 700, authorized service personnel may require access to inventory or components of the machine 700 located behind the front panel 735. To open the front panel 735 and gain access to the internal components of the machine 700 as well as the product inventory stored in the machine 700, the locks 850 must be unlocked, as explained below.

Figure 3:
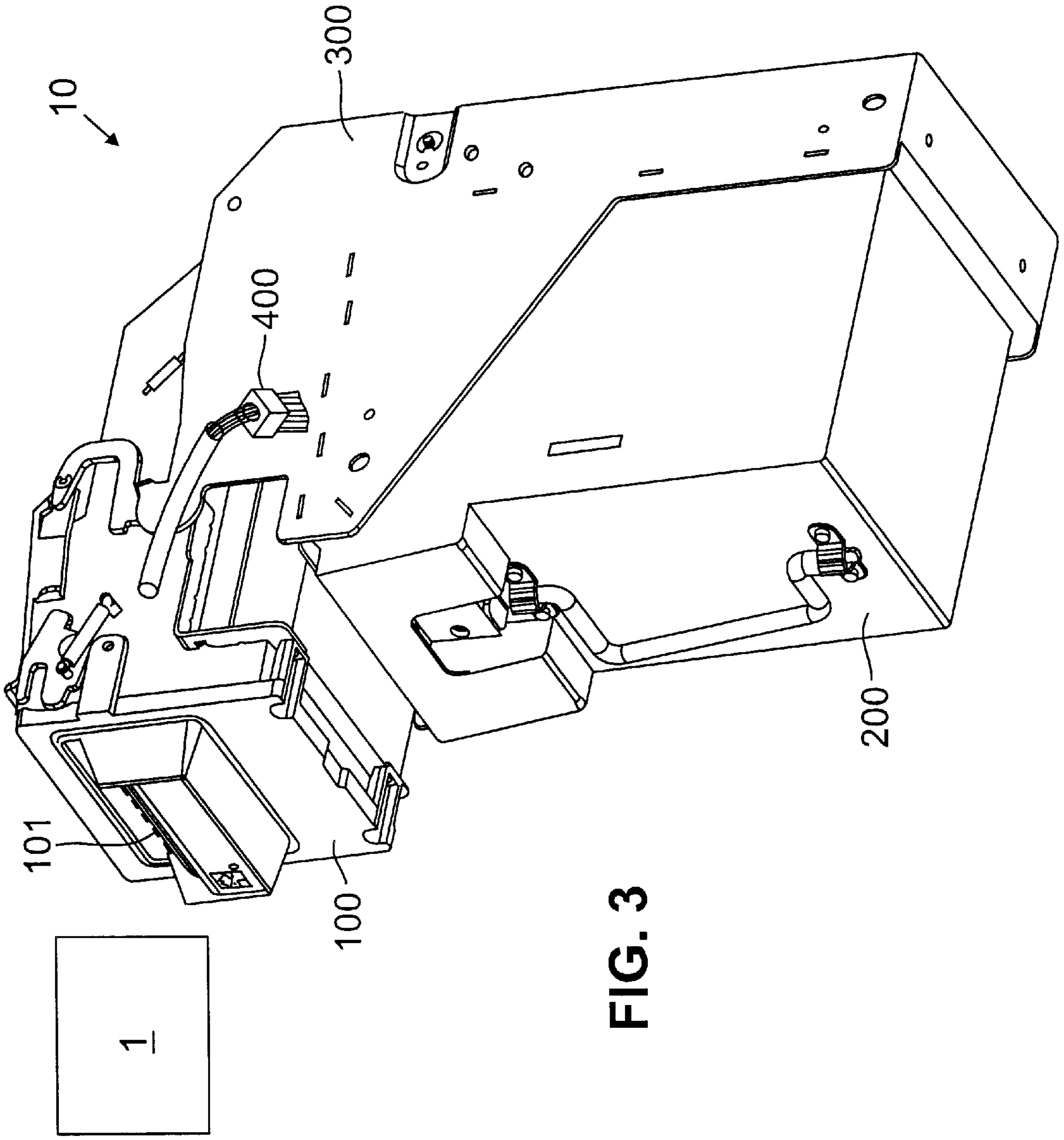
FIG. 3 is an overall diagram of a bill validator-stacker unit.

FIG. 3 illustrates a bill validator-stacker unit 10 which may be used as the bill validator-stacker unit 800. The unit 10 has three major sub-components: a bill validator and transport unit 100, a lockable removable currency cassette 200 and a mounting chassis 300. The validator and transport unit 100 has an entry 101 for receiving bills, such as banknotes, as well as security coupons, such as the security coupon 1, inserted into the entryway 760. The security coupon 1 is preferably the same size and shape as bills which are to be accepted by the unit 100. Imprinted on the security coupon 1 is a unique code or mark, in the form of a bar code or a translucent water mark, for example. Alternatively, or in addition, the security coupon 1 may include a magnetic code imprinted on the surface of the coupon 1 using, for example, magnetic ink. As described in greater detail below, a security coupon such as the security coupon 1 serves as a physical key to permit the front panel 735 to be unlocked and to permit removal of the cassette 200. The unit 10 is connected by a cable 400 to a central network controller (not shown in FIG. 3).

Figure 4:
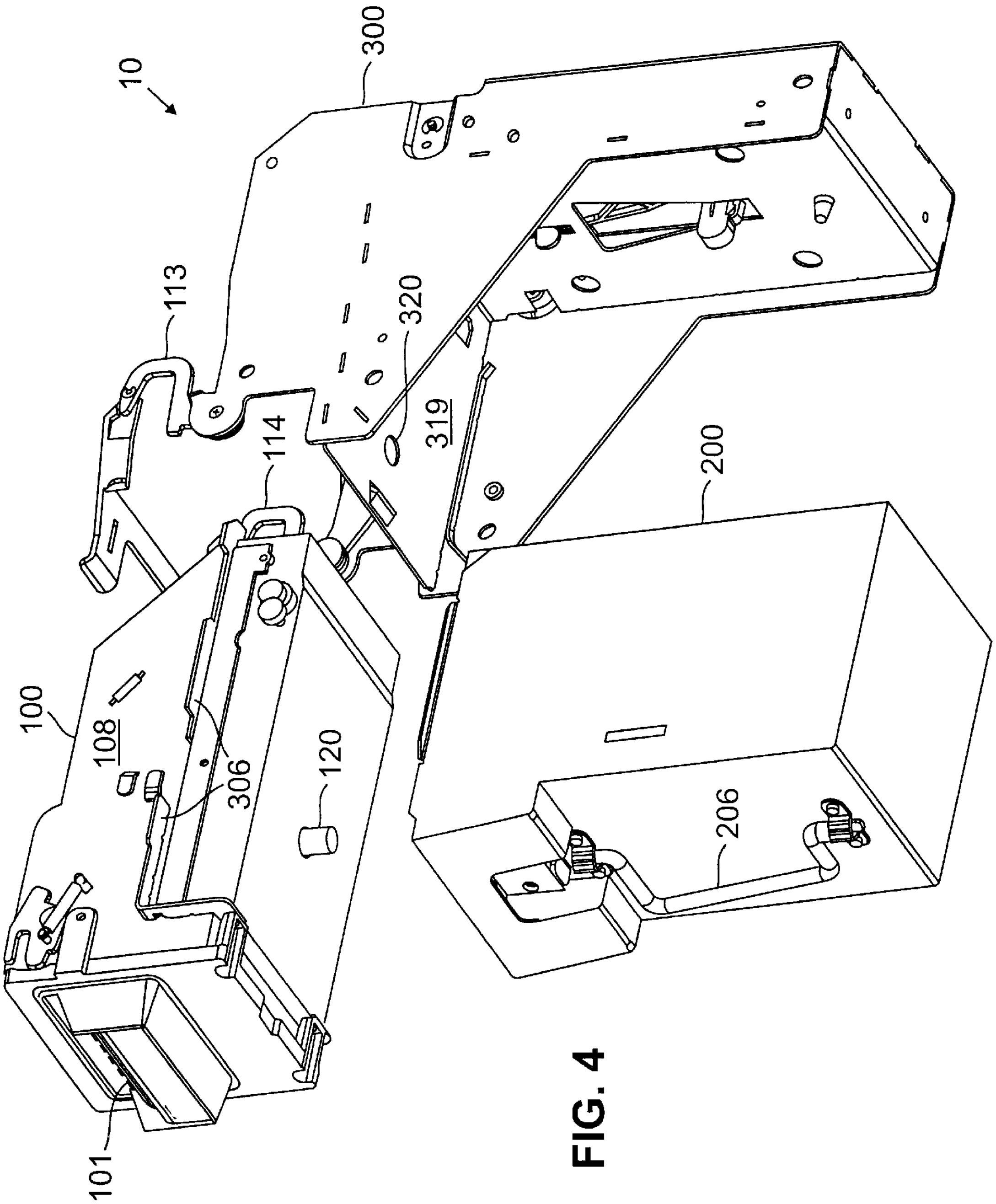
FIG. 4 is an exploded diagram showing the inter-relationship of various components of the bill validator-stacker unit.

As illustrated in the exploded view of the unit 10 shown in FIG. 4, the bill validator and transport unit 100 and the cassette 200 are readily removable from the front of the unit 10. The currency validator and transport unit 100 has side plates, such as the side plates 108, 109 (see FIG. 6) which provide support for components located between them. Rails 306 guide the validator and transport unit 100 as it is being placed in or removed from the mounting chassis 300. An additional locating rod can also be used to properly position the unit 100. Spring loaded levers 113, 114 are used to clamp the unit 100 to the mounting chassis 300.

The mounting chassis has a support surface 319 which is substantially perpendicular to the sides 108, 109 of the currency validator and transport unit 100 when the unit 100 is inserted into the chassis 300. In one implementation of the invention, when the validator and transport unit 100 is fully inserted into the mounting chassis 300, a rigid rod or plunger 120 is aligned with a hole 320 extending through the support surface 319. The hole 320 is large enough to permit the rod 120 to extend through it. The respective diameters of the rod 120 and the hole 320 also are sufficiently small to prevent unauthorized access to and tampering with the electronic components in the transport unit 100. As discussed more fully below, the rod 120 serves as a locking member and is part of an electronic locking mechanism which locks the cassette 200 to the unit 10. It should be understood, however, that other electronic locking mechanisms may be used to lock the cassette 200 to the unit 10. The cassette 200 is also designed to be removed from the mounting chassis 300 by an authorized person as discussed more fully below.

Figure 5:
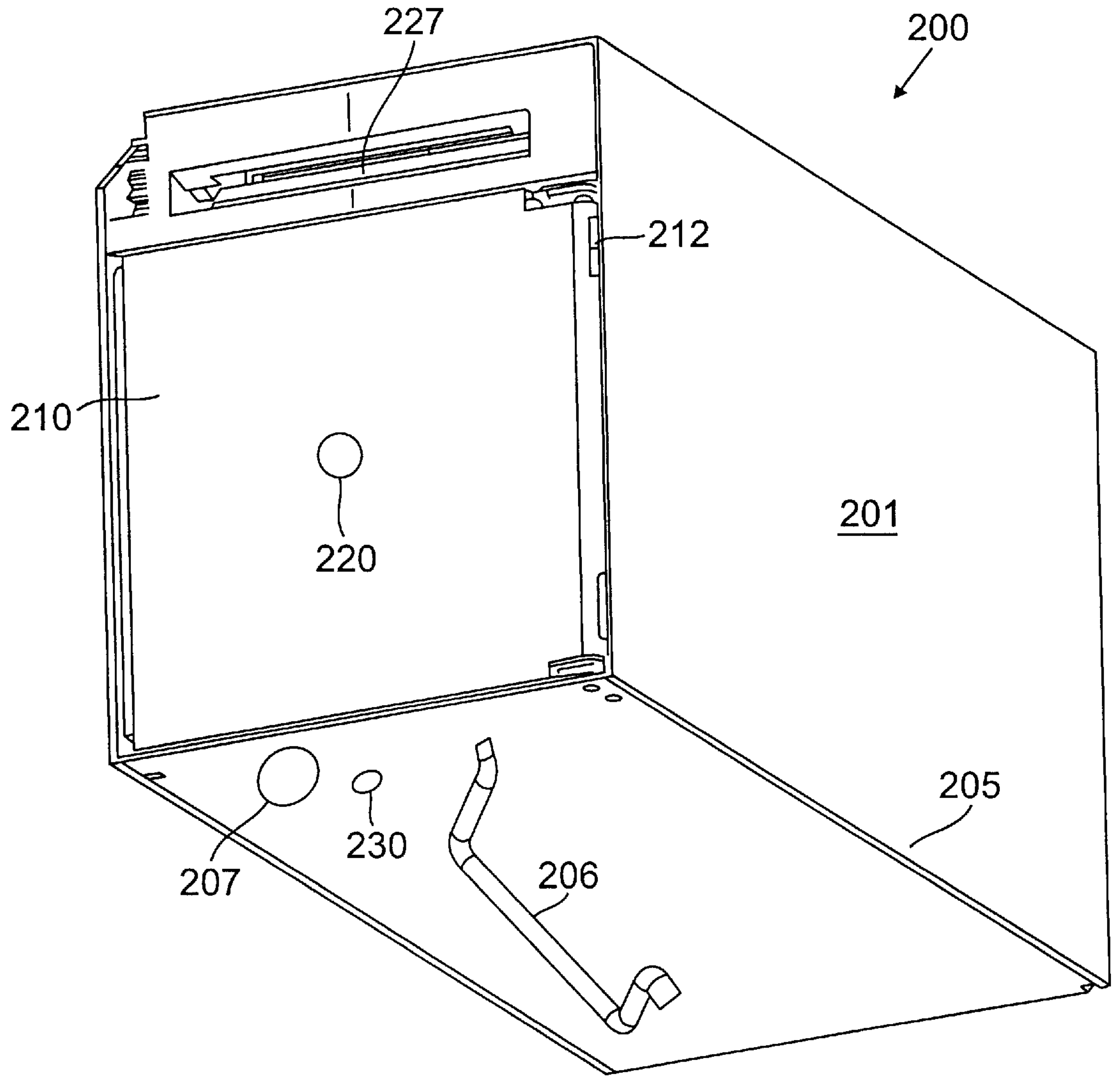
FIG. 5 is a perspective drawing of a currency cassette.

FIG. 5 illustrates further details of the cassette 200. The cassette 200 includes a sealed metal surface 205 which may be sealed by rivets, welding or any other suitable secure method of closure. The cassette 200 has a narrow slot or opening 227. A banknote or coupon, such as the security coupon 1, passing from the validator and transport unit 100 to the cassette 200 enters the cassette 200 through the opening 227. The opening 227, however, is sufficiently small and the components inside the cassette 200 are arranged such that no ready access to currency or coupons stacked within the cassette 200 is provided.

The cassette 200 has a second small opening 220 located on a lid 210 at the top of the cassette 200. The opening 220 is positioned such that, when the cassette 200 is fully inserted into the mounting chassis 300, the opening 220 is aligned opposite the opening 320 in the support surface 319 of the mounting chassis 300. The opening 220 in the cassette 200 is approximately the same size as the opening 320 of the support surface 319. The opening 220 is sufficiently large to receive the locking member 120 yet small enough to prevent unauthorized access to the contents of the cassette 200. Under normal operating conditions, the rod or locking member 120 is extended through the two openings 320, 220 to prevent unauthorized removal of the cassette 200. As more fully explained below, when a properly encoded security coupon 1 is received and recognized by the unit 10, the rod 120 is automatically retracted from the openings 220, 320, thereby unlocking the cassette 200 from the unit 10 and allowing the cassette 200 to be removed from the chassis 300.

Attached at one end of the cassette 200 is a handle 206 which is used to remove the cassette 200 from the unit 10. The cassette also includes at least one lock 207 for locking the cassette 200 to prevent unauthorized access to the contents of the cassette. When the lock 207 is unlocked using a key, the lid 210 can be swung open about a hinge 212 so that the contents of the cassette 200 can be readily removed. The lid 210 can then be closed, the lock 207 can be locked, and the cassette 200 can be returned to service by sliding it back into any unit, such as the unit 10, which needs an empty cassette.

Figure 6:
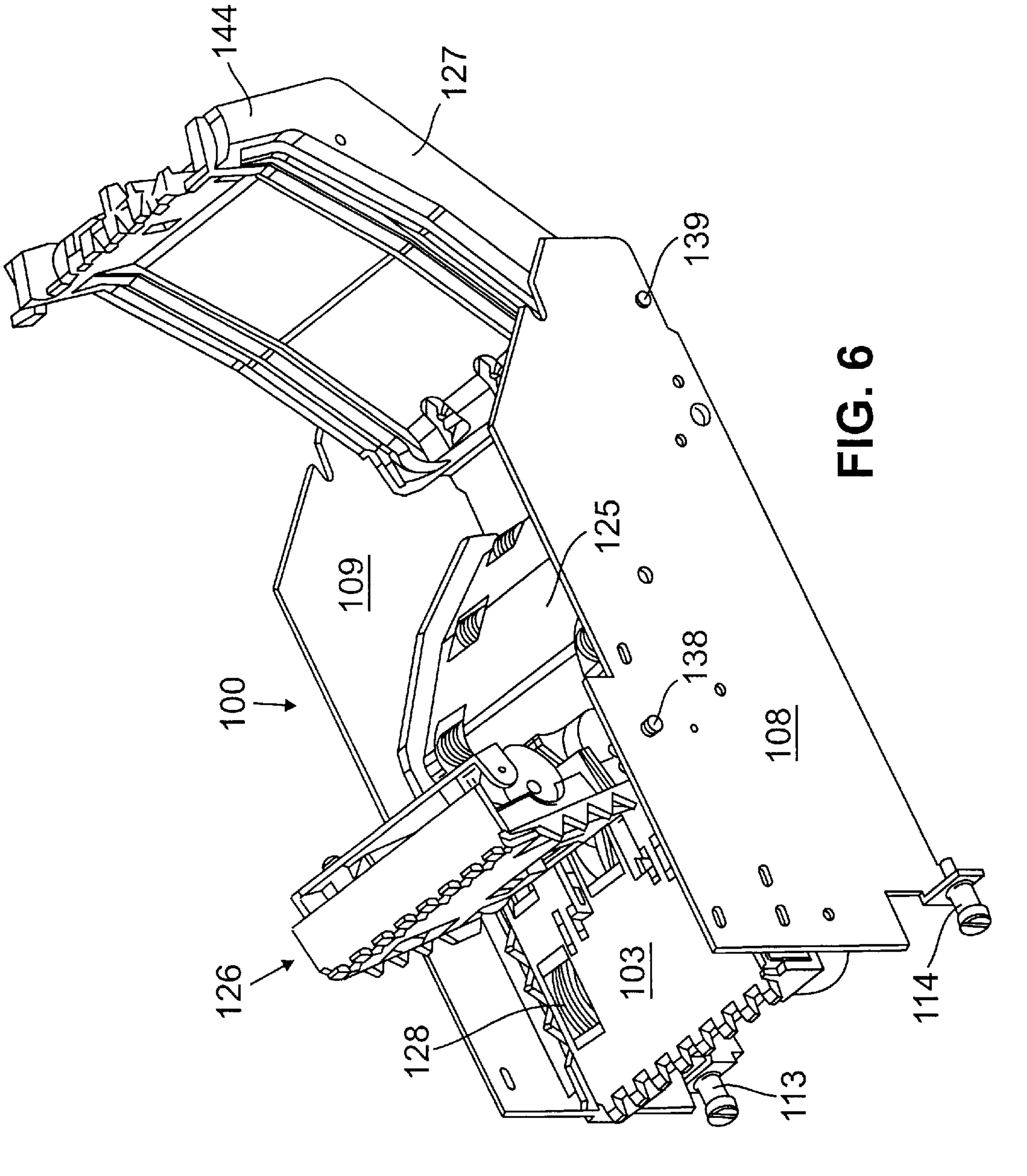
FIG. 6 is a perspective drawing of the currency validator and transport unit.

FIG. 6 is a perspective drawing of the currency validator and transport unit 100 and illustrates additional features of the unit 100. Bills and security coupons travel through the unit 100 along a transport path 103 which is formed by three subassemblies. A transport base 125 forms the bottom portion of the transport path 103. The top portion is formed by a recognition assembly 126 and a guide assembly 127. FIG. 6 shows both the recognition assembly 126 and the guide assembly 127 in their open position. The guide assembly 127 has a forward profile 144 which, when in the normal or closed position, is held captive by the closed recognition assembly 126. To close the unit 100, the guide assembly is rotated toward the transport base 125 about a pivot 139. The recognition assembly 126 is then rotated toward the transport base 125 about a pivot 138 thereby capturing and locking in place the guide assembly 127. The recognition assembly is fastened in place with capture screws or spring clips. The unit 100 includes motor driven belts 128 located along the transport path 103. The belts may be operated in a forward direction to advance a bill or security coupon inserted into the unit 100 through the entry 101. The belts 128 may also be operated in the reverse direction to eject a rejected bill or security coupon.

The recognition assembly 126 determines the genuineness and denomination of bills and the genuineness of security coupons received through the entry 101 of the unit 100. For this purpose, the assembly 126 includes multiple sensors 503 (see FIG. 7) positioned along the transport path 103 to generate electrical signals in response to certain features of inserted banknotes or security coupons. An example of a suitable validator is disclosed in U.S. Pat. No. 4,628,194, assigned to the assignee of the present invention and incorporated by reference herein. Thus, for example, a transmissive sensor can be used to detect the physical presence or absence of a bill or security coupon, a reflective sensor can be provided to detect optical information on the surface of the bill or coupon, and a magnetic sensor can be provided to detect magnetic information on the surface of the bill or security coupon. These three sensors are positioned so that they are encountered in sequence as a bill or security coupon moves through the validator. Alternatively, or in addition, other sensor arrangements can be used, for example, to detect and recognize bar codes imprinted on the security coupons.

Figure 7:
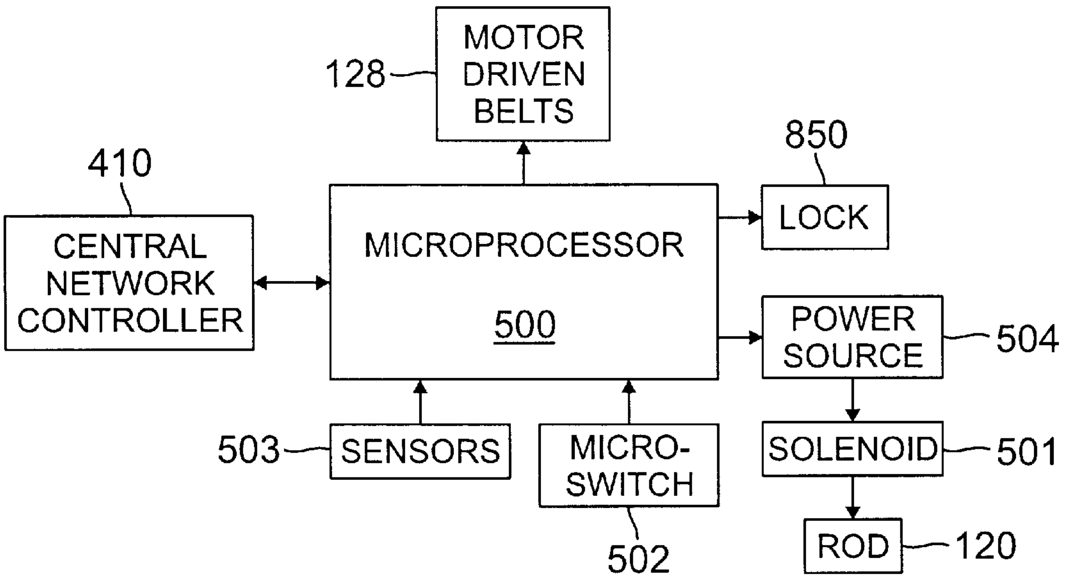
FIG. 7 illustrates the flow of information and signals between various components of the invention.

As shown in FIG. 7, the unit 10 also includes a microprocessor 500 for receiving the electrical signals generated by the sensors 503. The microprocessor 500 is programmed to evaluate the genuineness and denomination of inserted bills and the genuineness of inserted security coupons based upon the electrical signals received from the sensors 503. The microprocessor 500 can be incorporated as part of the recognition assembly. Alternatively, in certain implementations, the microprocessor 500 can be separate from the validator 100 or even separate from the unit 10. For example, the microprocessor 500 can be incorporated as part of the vending controller 830 or the central network controller 410.

The microprocessor 500 is further programmed to control the operation of the motor driven belts 128 in response to a determination of the genuineness of an inserted bill or security coupon. In addition, the microprocessor 500 is connected to the central network controller 410 through the cable 400. In this way, the microprocessor 500 can send and receive information to and from the central network controller 410.

Figure 8A:
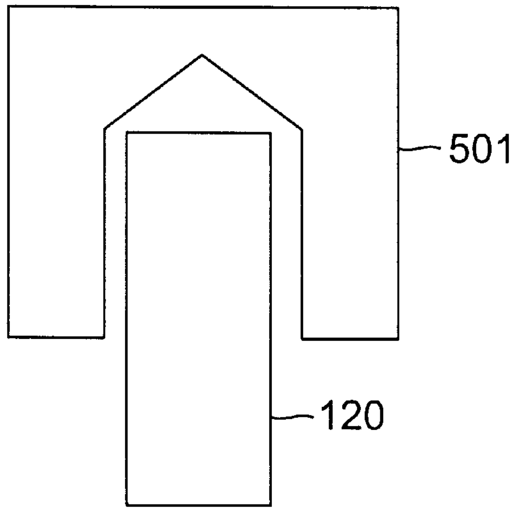
FIGS. 8A and 8B illustrate further details of the electronic locking mechanism.
Figure 8B:
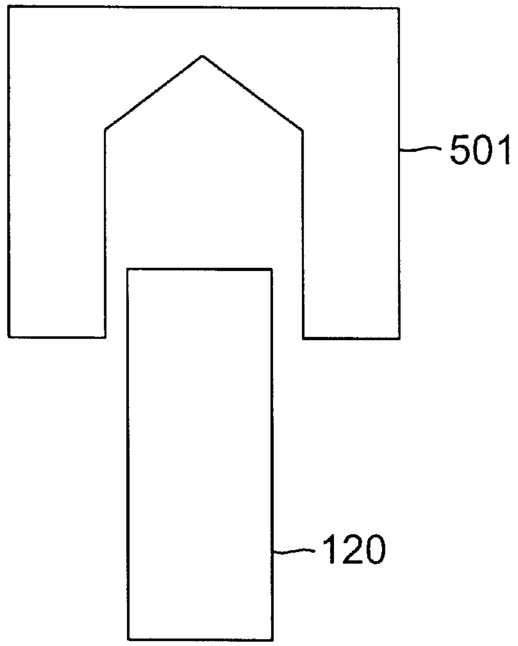

The microprocessor 500 also controls a power source 504 which provides power to a solenoid 501, or other electronic means such as an electric motor. In one implementation, the position of the rod or locking member 120 is determined according to the energized or de-energized state of the solenoid 501. Specifically, when the solenoid 501 is energized, the rod 120 is in a first retracted upward position as illustrated in FIG. 8A. When the solenoid 501 is de-energized, the rod 120, which is spring and gravity loaded, drops to a second lower position as illustrated in FIG. 8B. During normal operation of the unit 10, the cassette 200 is inserted within the chassis 300 and the rod 120 is extended downward in the second position through the opening 220 in the cassette 200. When the solenoid 501 is energized, the rod 120 moves to the first position such that it no longer extends through the opening 220.

The microprocessor 500 is also electrically connected to a microswitch 502 which senses when the cassette 200 is fully inserted into the chassis 300 as well as when the cassette 200 is removed.

Figure 9:
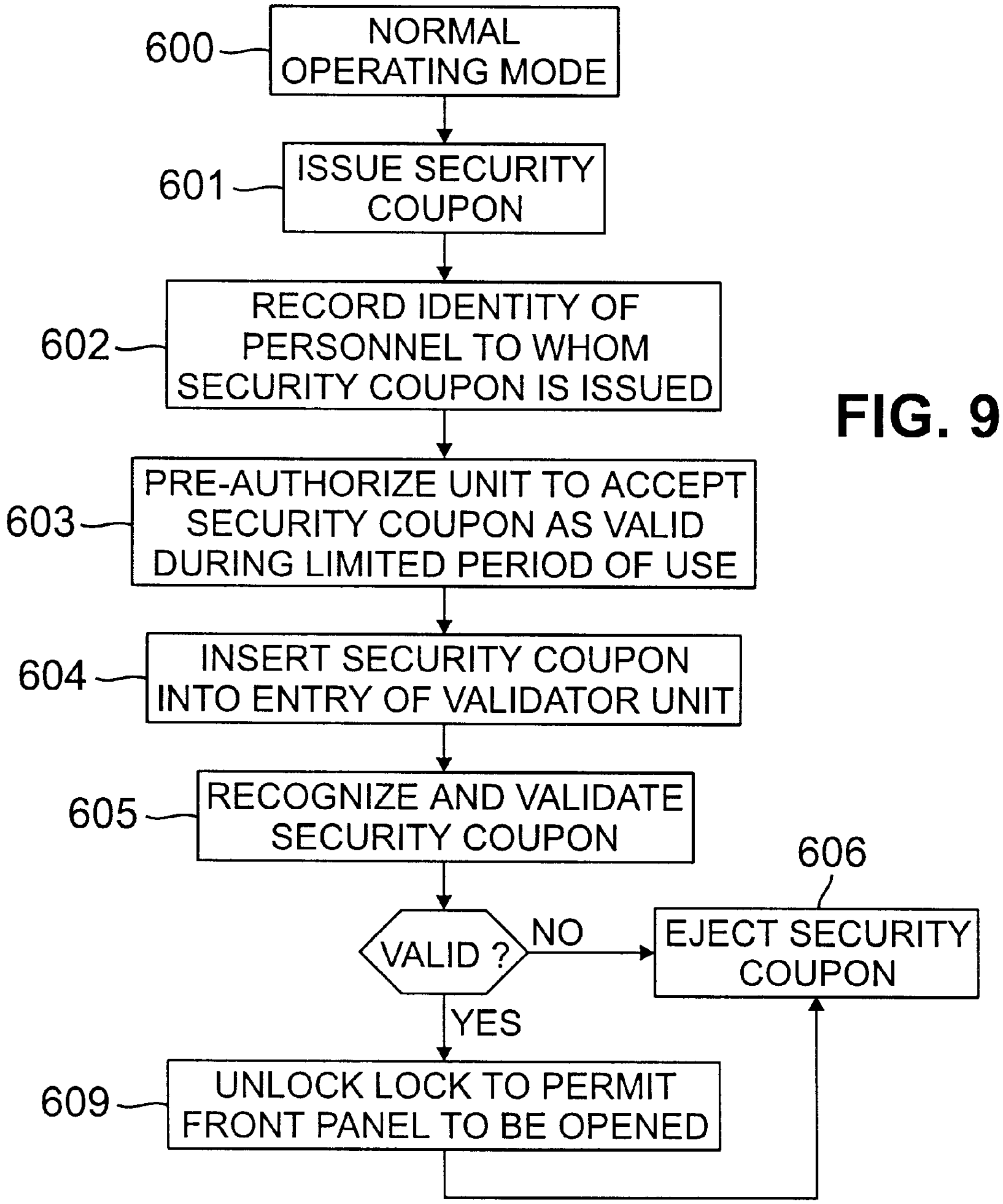
FIG. 9 is a flow chart showing the steps of operating the vending machine according to certain implementations of the invention.

FIG. 9 illustrates a method of operating the machine 700 according to certain implementations of the invention. As indicated by 600, during normal operation of the machine 700, a cassette, such as the cassette 200, is inserted into the chassis 300, the cassette 200 is locked to the validator unit 100, and the front panel 735 is locked by the lock 850. In the normal operating mode, customers can purchase products 710 from the machine 700, for example, by inserting currency in the form of one, five, ten and twenty dollar bills into the entryway 760 of the vending machine 700. Inserted bills are received through the entry 101 of the bill validator unit 100, and genuine bills are transported through the unit 100 to the cassette 200 where they are stacked in known fashion.

A security coupon, such as the security coupon 1, is issued by the central network controller 410 to authorized personnel, as indicated by 601. As shown by 602, the identity of personnel to whom the particular security coupon 1 is given can be recorded and tracked by the central network controller 410. In certain implementations of the invention, the central network controller 410 pre-authorizes the unit 10 to accept the security coupon 1 as valid by sending a message to the microprocessor 500 at the time the coupon is issued, as indicated by 603. The message can include, for example, the unique code contained in the security coupon 1. In some implementations, the central network controller 410 also provides a signal to the microprocessor 500 which limits the time during which the issued coupon 1 is to be considered valid.

As indicated by 604, the authorized personnel takes the security coupon 1 to the unit 10 and inserts the coupon 1 into the entryway 760. The security coupon is received in the bill validator unit 100 and, as indicated by 605, is advanced along the transport path 103 where it is recognized by the recognition assembly 126. In certain implementations, if the recognition assembly 126 recognizes the inserted coupon 1 as a security coupon, it requests authorization from the central network controller 410 to accept the coupon 1 as valid. For this purpose, the microprocessor 500 can, for example, send the code recognized by the recognition assembly 126 to the central network controller 410, which returns a signal indicating whether the coupon should be accepted. If the inserted security coupon 1 is not accepted as valid, then the microprocessor 500 causes the belts 128 to reverse direction, and the coupon 1 is ejected through the entryway 760 via the entry 101, as indicated by 606. On the other hand, if the security coupon 1 is accepted as valid, then, as indicated by 609, the microprocessor 500 generates a signal which unlocks the lock 850, thereby permitting the authorized personnel to open the front panel 735 of the vending machine 700. The coupon 1 can be ejected from the entryway 760 and returned to the authorized personnel for subsequent use. By opening the front panel 735, the authorized personnel can service various internal components of the machine 700.

Figure 10:
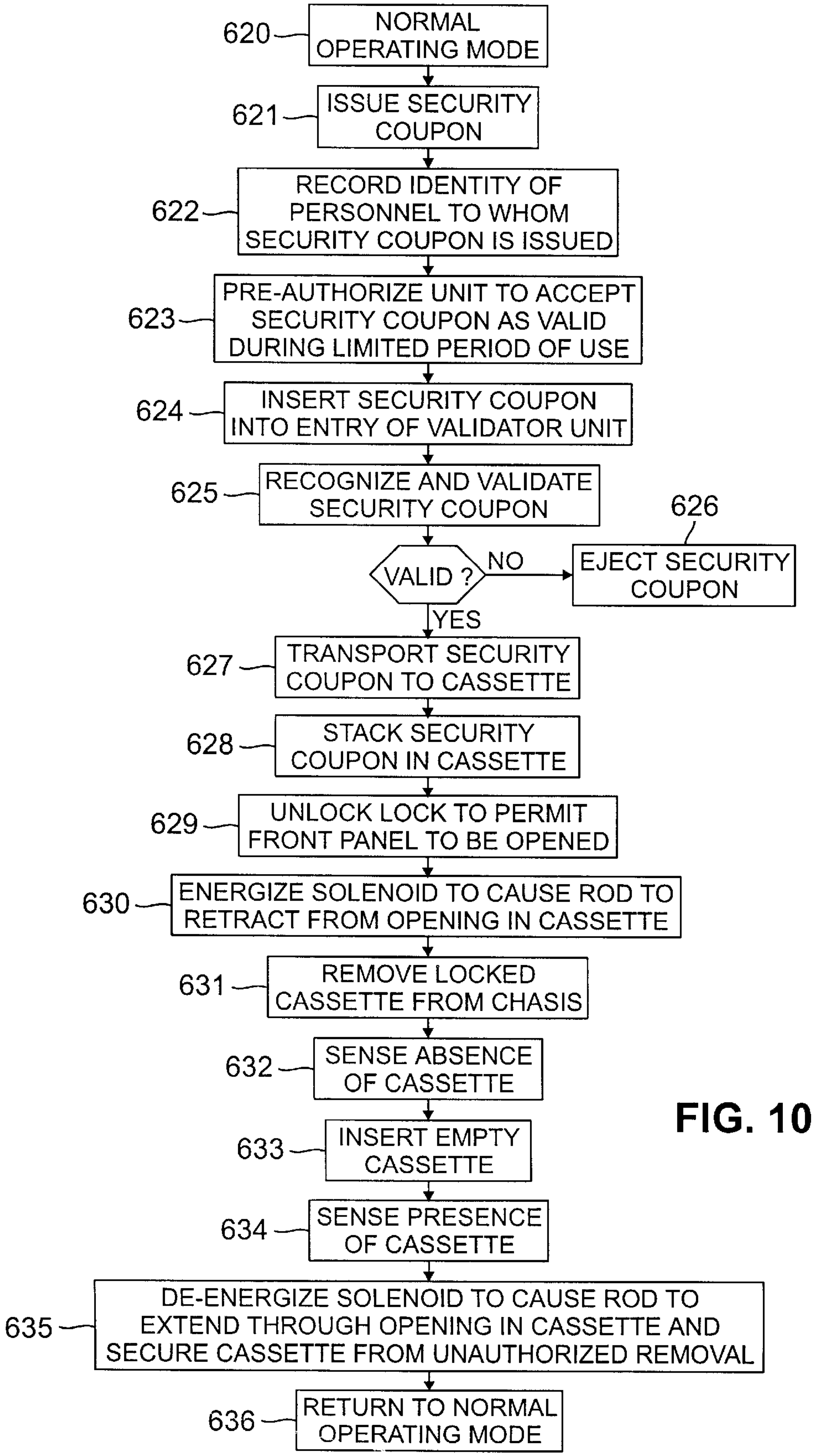
FIG. 10 is a flow chart showing the steps of operating the vending machine according to additional implementations of the invention.

FIG. 10 illustrates another method of operating the machine 700 according to additional implementations of the invention. As indicated by 620, during the normal operation mode, a cassette, such as the cassette 200, is inserted into the chassis 300, the cassette 200 is locked to the validator unit 100, and the front panel 735 is locked by the lock 850. During normal operation, with respect to the electronic locking mechanism shown in FIG. 8, the solenoid is de-energized, and the rod or locking member 120 is extended through the opening 220, thereby preventing unauthorized removal of the cassette 200. In the normal operating mode, customers can purchase products 710 from the machine 700, for example, by inserting banknotes into the entryway 760 of the vending machine 700. Inserted bills are received through the entry 101 of the validator unit 100, and genuine bills are transported through the unit 100 to the cassette 200 where they are stacked in known fashion.

When the cassette 200 is almost full, or at some other predetermined time, a security coupon, such as the coupon 1, is issued by the central network controller 410 to authorized personnel, as indicated by 621. As shown by 622, the identity of personnel to whom the particular security coupon 1 is given can be recorded and tracked by the central network controller 410. The central network controller 410 can pre-authorize the unit 10 to accept the security coupon 1 as valid by sending a message to the microprocessor 500 at the time the coupon is issued, as indicated by 623. In some implementations, the central network controller 410 also provides a signal to the microprocessor 500 which limits the time during which the issued coupon 1 is to be considered valid.

As indicated by 624, the authorized personnel takes the security coupon 1 to the unit 10 and inserts the coupon 1 into the entryway 760. The security coupon is received in the bill validator unit 100 and, as indicated by 625, is advanced along the transport path 103 where it is recognized by the recognition assembly 126. If the recognition assembly 126 recognizes the inserted coupon 1 as a security coupon, it can request authorization from the central network controller 410 to accept the coupon as valid. If the inserted security coupon 1 is not accepted as valid, then the microprocessor 500 causes the belts 128 to reverse direction, and the coupon 1 is ejected through the entryway 760 via the entry 101, as indicated by 626. On the other hand, if the security coupon 1 is accepted as valid, then the coupon 1 is transported along the path 103 and passes through the opening 227 in the cassette 200 where it is stacked along with any previously stacked bills, as indicated by 627 and 628, respectively.

Figure 7A:
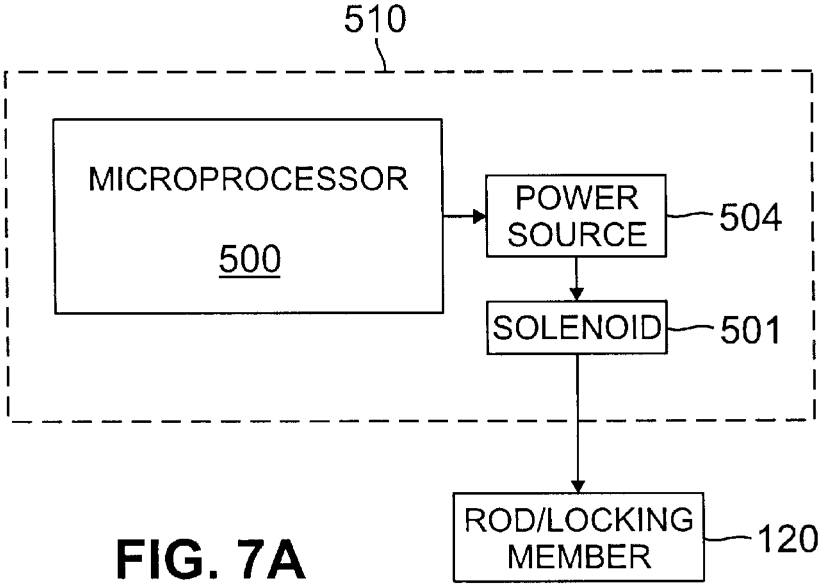
FIG. 7A illustrates an electronic locking mechanism for the cassette.

As indicated by 629, once the security coupon 1 is stored in the cassette 200, the microprocessor 500 generates a signal which unlocks the lock 850, thereby permitting the authorized personnel to open the front panel 735 of the vending machine 700. The microprocessor 500 also controls the power source 504 to energize the solenoid 501, thereby causing the locking member or rod 120 to move from the second position to the first position, as indicated by 630. The microprocessor 500, the power source 504 and the solenoid 501 thus form a control unit 510 (FIG. 7A) which controls the position of the locking member 120. As previously discussed, when the locking member 120 is in the first position, it no longer extends through the opening 220 in the cassette 200. The authorized personnel can thus grasp the handle 206 and slide the cassette 200 out of the chassis 300, as indicated by 631. As an added level of security, the microprocessor 500 can control the locking member 220 to return to its locked second position if the cassette 200 is not removed within a predetermined period of time.

As shown by 632, upon removal of the cassette 200 from the chassis 300, the microswitch 502 provides a signal to the microprocessor 500 indicating that the cassette 200 has been removed and that no cassette is presently inserted in the unit 10. An empty cassette, similar to the removed cassette 200, can be inserted into the chassis 300 to permit continued operation of the unit 10, as indicated by 633. As further shown by 634, when another cassette is inserted, the microswitch 502 provides a signal to the microprocessor 500 indicating that a cassette has been inserted. The microprocessor 500 controls the power source 504 to de-energize the solenoid 501, thereby allowing the rod 120 to return to the second position, as indicated by 635. In this position, the rod 120 extends through an opening in the lid of the new cassette, similar to the opening 220. The position of the rod 120 can also be inductively sensed to provide an additional level of security. In addition, a trial bill stacking cycle can be performed to verify proper operation of the unit 10 and to verify that a cassette is truly present. The new cassette is thus secure from unauthorized removal, and the unit 10 can continue to operate in its normal mode to accept, validate and stack bills, as indicated by 636. The service personnel would then close the front panel 735 which is automatically and securely locked by the lock 850.

The removed locked cassette 200 containing the stacked bills as well as the security coupon 1 can be returned to different personnel who are responsible for unlocking the lock 207 of the cassette 200 and for removing the bills and the security coupon 1.

As should be clear from the foregoing discussion, the microprocessor 500 can be programmed, or instructed by the central network controller 410, to respond to a recognized security coupon in different ways. For example, some security coupons may result in unlocking only the lock 850 of the front panel. This would allow service personnel to open the front panel 735 and gain access to the product inventory, but not to remove the cassette 200. Other security coupons cause the cassette 200 to be unlocked from the unit 10, thereby permitting the service personnel to remove the cassette 200 as well. Other security coupons can include a code which, when received in and recognized by the bill validator section, cause other locks in the machine 700 to be unlocked. In this way, access to various parts of the vending machine 700 can be tightly controlled and monitored.

Figure 11A:
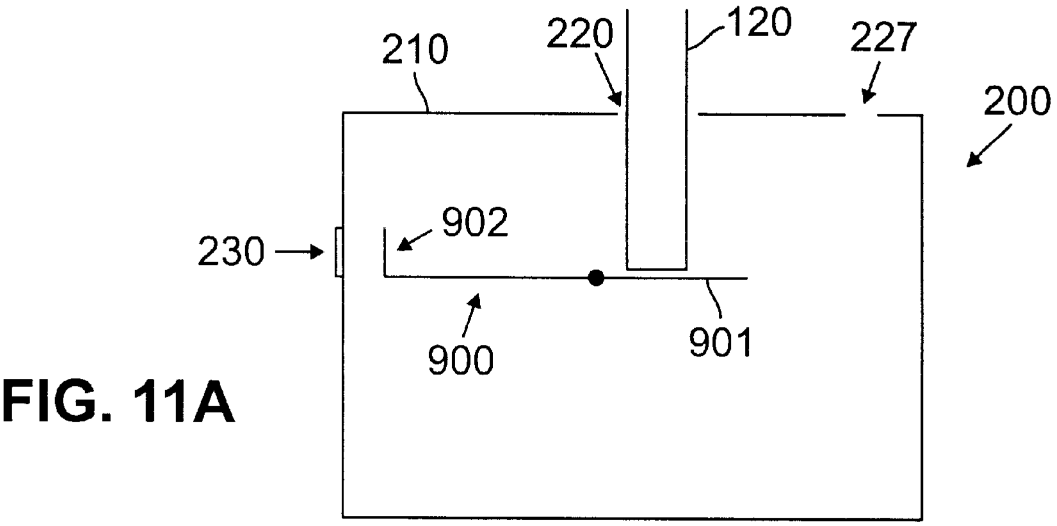
FIGS. 11A and 11B illustrate the use of an indicator flag according to the invention.
Figure 11B:
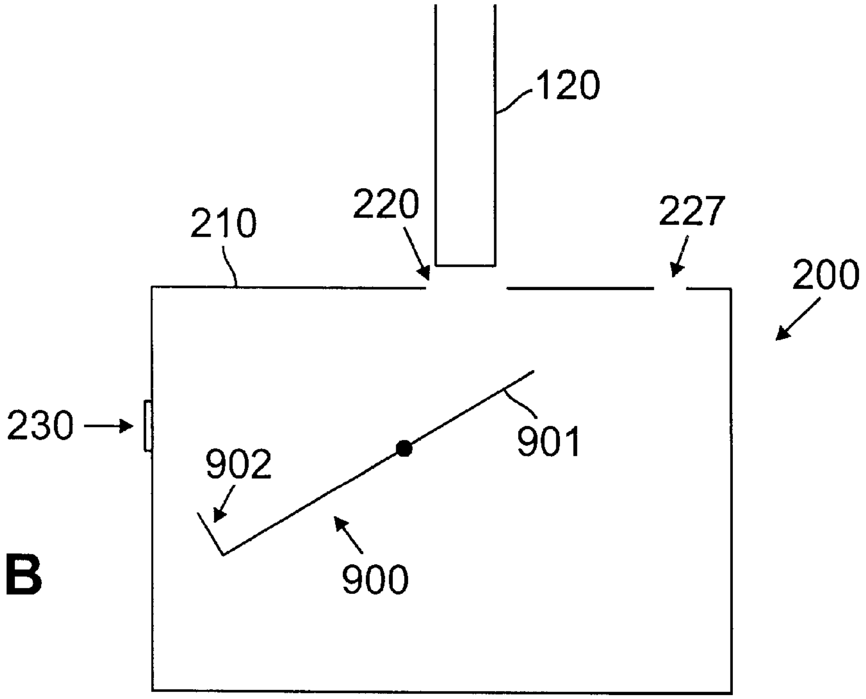

As shown in FIGS. 11A and 11B, an indicator flag 900 can be rotatably attached to an inner surface of a side wall 201 of the cassette 200. FIGS. 11A and 11B show the indicator flag 900 in first and second positions, respectively. As shown in FIG, 11A, when the locking member 120 is extended through the opening 220 in the cassette 200, the locking member 120 places pressure on an arm 901 of the indicator flag 900. In this position, an extension 902 of the indicator flag is aligned with and is visible through a small window 230 in the cassette 200, thus indicating to the service personnel that the cassette 200 is locked to the unit 10. On the other hand, when the locking member 120 is removed from the opening 220 in the cassette 200, the indicator flag 900 falls to the position shown in FIG. 11B, The extension 902 of the indicator flag 900 no longer appears through the window 230, thus indicating to the service personnel that the cassette 200 is unlocked from the unit 10.

Although the invention has been described in the context of vending machines, the unit 10 is generally well suited to other high security environments such as the gaming industry. Thus, another use for the validator-stacker unit 10 is as a validator in a U.S. one, five, ten, twenty, fifty or one hundred dollar slot machine.

Various implementations of the invention provide one or more of the following advantages. Security coupons such as those described above can be produced relatively inexpensively. Furthermore, they can be produced at the premises where they are to be used. The use of security coupons which can be recognized and validated by the bill validator portion of the vending machine can provide added security because the identity of personnel receiving each issued security coupon can be tracked. Also, since the bill validator portion of the machine performs the recognition and validation of inserted security coupons, existing bill validators can be used in conjunction with security coupons to provide a high level of security. The machine need not be retrofit with special devices designed for the sole purpose of receiving and identifying security cards or the like. Also, since the same entry slot can be used for inserting both banknotes and security coupons, the outer appearance of the validator need not be changed.

The use of security coupons may lessen the need for using passwords that must be entered gain access to and remove internal components, cash and inventory from the machine. Furthermore, through the use of a central network controller, additional security can be provided by limiting the time during which the security coupon is considered valid. Also, the validity of lost or stolen coupons can be revoked by the central network controller at any time.

In those implementations in which the security coupon is stacked in the locked cassette, a highly secure paper trail is created for audit purposes. Thus, for example, cassettes from multiple machines or units can be positively tracked. Also, the use of the security coupon as the key to an electronic lock for the cassette can lessen the need for expensive locks used in some currency validator-stacker units.

Other implementations are within the scope of the following claims.

What is claimed is:

1. A method of using a security coupon in connection with a vending machine having a bill validator section and a lock to prevent unauthorized access to internal components of the vending machine, the method comprising:

receiving a security coupon in the bill validator section of the vending machine;

recognizing the security coupon in the bill validator section; and unlocking the lock in response to recognizing the security coupon.

2. The method of claim 1 comprising unlocking a front panel of the vending machine.

3. The method of claim 1 wherein the vending machine comprises a currency cassette, the method further comprising storing the security coupon in the currency cassette.

4. The method of claim 3 comprising unlocking the currency cassette after storing the security coupon to permit removal of the currency cassette from the vending machine.

5. The method of claim 1 comprising recognizing a code imprinted on the security coupon.

6. The method of claim 1 comprising recognizing a magnetic code on the security coupon.

7. The method of claim 1 comprising recognizing a bar code on the security coupon.

8. The method of claim 1 comprising requesting authorization from a central network controller to accept the security coupon as valid.

9. The method of claim 1 comprising receiving authorization from a central network controller to accept the security coupon as valid.

10. The method of claim 1 further comprising determining whether the security coupon is valid.

11. A method of using a security coupon in connection with a bill validator-stacker unit having a bill validator section and a currency cassette locked to the unit, the method comprising:

receiving a security coupon in the bill validator section of the unit;

recognizing the security coupon;

storing the security coupon in the currency cassette; and unlocking the currency cassette from the unit after storing the security coupon to permit removal of the currency cassette from the unit.

12. The method of claim 11 comprising recognizing a unique code on the security coupon.

13. The method of claim 11 comprising recognizing a watermark on the security coupon.

14. The method of claim 11 comprising recognizing a magnetic code on the security coupon.

15. The method of claim 14 comprising recognizing a bar code on the security coupon.

16. The method of claim 11 comprising requesting authorization from a central network controller to accept the security coupon as valid.

17. The method of claim 11 comprising receiving authorization from a central network controller to accept the security coupon as valid.

18. The method of claim 11 further comprising receiving a signal limiting the time during which the security coupon is to be considered valid.

19. The method of claim 11 wherein unlocking the cassette comprises controlling the position of a locking member.

20. The method of claim 19 wherein controlling the position comprises controlling energy provided to a solenoid.

21. The method of claim 20 wherein controlling energy comprises energizing the solenoid.

22. The method of claim 11 wherein unlocking the currency cassette comprises unlocking an electronically controlled locking mechanism.

23. The method of claim 11 further comprising controlling the position of an indicator flag to indicate whether the currency cassette is locked to the unit.

24. The method of claim 11 wherein unlocking the currency cassette comprises unlocking the currency cassette from the validator section.

25. A currency validator-stacker unit comprising:

a validator section for determining whether inserted banknotes and security coupons are genuine;

a removable currency cassette connected to the validator section;

a transport path for transporting genuine banknotes from the validator section to the currency cassette;

a locking mechanism for locking the currency cassette to the currency validator-stacker unit, wherein the currency cassette can be removed from the currency validator-stacker unit only when the locking mechanism is unlocked; and a control unit for unlocking the locking mechanism when a security coupon received in the validator section is recognized as genuine.

26. The currency validator-stacker unit of claim 25 wherein the transport path transports the received security coupon to the currency cassette, and the control unit unlocks the locking mechanism after the security coupon is stored in the currency cassette.

27. The currency validator-stacker unit of claim 25 wherein the locking mechanism locks the currency cassette to the validator section.

28. The currency validator-stacker unit of claim 25 wherein the locking mechanism comprises an electronically controlled lock.

29. The currency validator-stacker unit of claim 25 wherein the locking mechanism comprises a rod, and the currency cassette comprises an opening through which the rod can be extended to lock the currency cassette to the currency validator and stacker unit.

30. The currency validator-stacker unit of claim 29 wherein the control unit comprises a solenoid.

31. The currency validator-stacker unit of claim 30 wherein the rod is spring and gravity loaded.

32. The currency validator-stacker unit of claim 25 wherein the control unit comprises a microprocessor.

33. The currency validator-stacker unit of claim 25 further comprising a microswitch for sensing when the currency cassette is removed from the currency validator-stacker unit.

34. The currency validator-stacker unit of claim 25 wherein the received security coupon comprises an imprinted code.

35. The currency validator-stacker unit of claim 34 wherein the imprinted code comprises a bar code.

36. The currency validator-stacker unit of claim 25 wherein the received security coupon comprises a magnetic code.

37. The currency validator-stacker unit of claim 36 wherein the magnetic code is formed of magnetic ink.

38. A vending machine comprising:

a front panel;

an entryway in the front panel for receiving banknotes and security coupons;

a validator section connected to the entryway for determining whether inserted banknotes and security coupons are genuine;

a removable currency cassette connected to the validator section;

a transport path for transporting genuine banknotes from the validator section to the currency cassette;

one or more locks to prevent unauthorized access to internal components of the vending machine; and a control unit for unlocking the one or more locks when a security coupon received in the validator section is recognized as genuine.

39. The vending machine of claim 38 wherein at least one of the locks must be unlocked to open the front panel.

40. The vending machine of claim 38 wherein at least one of the locks must be unlocked to remove the currency cassette.

41. The vending machine of claim 38 further comprising a cable for sending and receiving security coupon information to and from a central network controller.

42. The vending machine of claim 38 wherein the received security coupon comprises an imprinted code.

43. The vending machine of claim 39 wherein the imprinted code comprises a bar code.

44. The vending machine of claim 38 wherein the received security coupon comprises a magnetic code.

45. The vending machine of claim 44 wherein the magnetic code is formed of magnetic ink.

46. The vending machine of claim 38 wherein the transport path transports the received security coupon to the currency cassette, and the control unit unlocks the one or more locks after the security coupon is stored in the currency cassette.

* * * * *